United States Patent [19]

Ejiri et al.

[11] Patent Number: 4,972,473
[45] Date of Patent: Nov. 20, 1990

[54] DATA COMMUNICATION METHOD AND APPARATUS USING NEURAL-NETWORKS

[75] Inventors: Masakazu Ejiri, Tokorozawa, Japan; Hidenori Inouchi, Dublin, Ireland; Shigeru Kakumoto, Kodaira; Kazuaki Iwamura, Hachioji, both of Japan

[73] Assignee: Hitachi, Ltd., Tokyo, Japan

[21] Appl. No.: 382,198

[22] Filed: Jul. 20, 1989

[30] Foreign Application Priority Data

Jul. 22, 1988 [JP] Japan ................................ 63-181897

[51] Int. Cl.⁵ ........................ H04N 7/167; G09C 1/00; H04L 9/06
[52] U.S. Cl. .......................................... 380/20; 380/9; 380/50; 380/10; 364/513; 364/602
[58] Field of Search ........................ 380/3–7, 380/9, 10, 20, 49, 50; 364/200, 900, 274.9, 276.6, 917.91, 917.95, 513, 602, 807

[56] References Cited

U.S. PATENT DOCUMENTS

| | | | |
|---|---|---|---|
| 4,782,460 | 11/1988 | Spencer | 364/807 |
| 4,807,168 | 2/1989 | Moopenn et al. | 364/602 |
| 4,866,645 | 9/1989 | Lish | 364/602 |
| 4,873,661 | 10/1989 | Tsividis | 364/807 |

Primary Examiner—Stephen C. Buczinski
Assistant Examiner—Bernarr Earl Gregory
Attorney, Agent, or Firm—Antonelli, Terry, Stout & Kraus

[57] ABSTRACT

A data communication apparatus comprises: means for dividing data to be transmitted into a plurality of blocks and extracting the data from each block; a first multi-layered neural network of three or more layers which has weighting coefficients to output the same data as the input data for the data extracted from each block and which can output data from an intermediate layer; the transmission data extracted from each block being inputted to the first neural network and outputted from the intermediate layer; means for encoding the transmission data which is outputted from the intermediate layer of the first neural network and, thereafter, transmitting; means for receiving and decoding the transmitted data; a second multi-layered neural network of three or more layers which has the same weight coefficients as those of the first neural network and can input data from an intermediate layer; the decoded data of each block being inputted to the second neural network and outputted from an output layer; and means for restoring the data on the basis of the output data from the output layer of the second neural network.

50 Claims, 6 Drawing Sheets

INPUT LAYER    INTERMEDIATE LAYER    OUTPUT LAYER

DATA COMMUNICATION METHOD AND APPARATUS USING NEURAL-NETWORKS

BACKGROUND OF THE INVENTION

The present invention provides a new data communication method and apparatus in which an intentional disturbance is applied to data to be transmitted, by using a neural network, thereby preventing the interception of the data during the data transmission. With the progress of the communication network technology in the future, the amount of communication data to be transmitted and received will become extremely large, and specifically, the transmission and reception of image data will become more and more important Since image data has a data structure which can be clearly understood at a glance, there is a possibility that the secrecy will be easily breached by the interception of such data in transmission. Therefore, particularly, upon transmission and reception of image data, it is necessary to enable the image data to be received by only a partner to whom a sender wants to send the data by using some disturbing means to establish a security in the transmitted data.

In a conventional apparatus, such as a facsimile apparatus, image data is transmitted and received in accordance with a standardized format based on a sequential raster scan of the data . Therefore, the image data to be transmitted has an intrinsic data structure which can be easily monitored by everyone. On the other hand, there is also a case where the image data is transmitted to a different partner due to an erroneous telephone call connection, thus resulting in breach of secrecy due to leaks. On the other hand, in ordinary data communication as well, for instance, the standard data encryption method as shown in DES (Data Encryption Standard: FIPS PUB 46, NBS, U.S. Dept., Commerce, 1977-1) and various other methods based on an open-key type encryption technique have been examined, and parts of these methods and techniques have already been put into practical use. However, in order to apply them to the transmission image data, since the encrypting and decrypting means in those methods are so complicated, they are not yet widely put into practical use especially for image data transmission.

SUMMARY OF THE INVENTION

It is an object of the present invention to a simple communication method and apparatus which can prevent the leakage of data resulting in a breach of secrecy due to the decipherment of the data during the data transmission or due to erroneous transmission and, particularly, which is suitable to the communication of image data.

To accomplish the above object, the invention ia based on the fundamental principle such that neural networks are provided on both the transmission and reception side, data converted by the neural network is transmitted, and the transmitted data is again reconstructed on the reception side through the neural network.

As mentioned above, the neural network functions a means for encrypting or decrypting data. Further, for the input data to be converted by the neural network and transmitted, the data sequence or data configuration (arrangement) can be changed in advance. Furthermore, the structure (connection and the number of neurons) and coefficients of the neural network can be also changed in advance. Those types of information, that is, the information with respect to the data sequence and data configuration which were used to convert the data to be transmitted and the information with regard to the structure and coefficients of the neural network which was used can be separately transmitted in advance to the transmission destination side prior to the transmission of the actual data. On the other hand, those types of information can be sent simultaneously as a header portion with the actual data as necessary. Thus, the reception side can reconstruct the neural network as necessary to decrypt the transmitted data and can properly decrypt the received data using the reconstructed neural network.

DESCRIPTION OF THE PREFERRED EMBODIMENTS

An embodiment of the present invention will be described hereinbelow with reference to FIG. 1.

Figure 1:
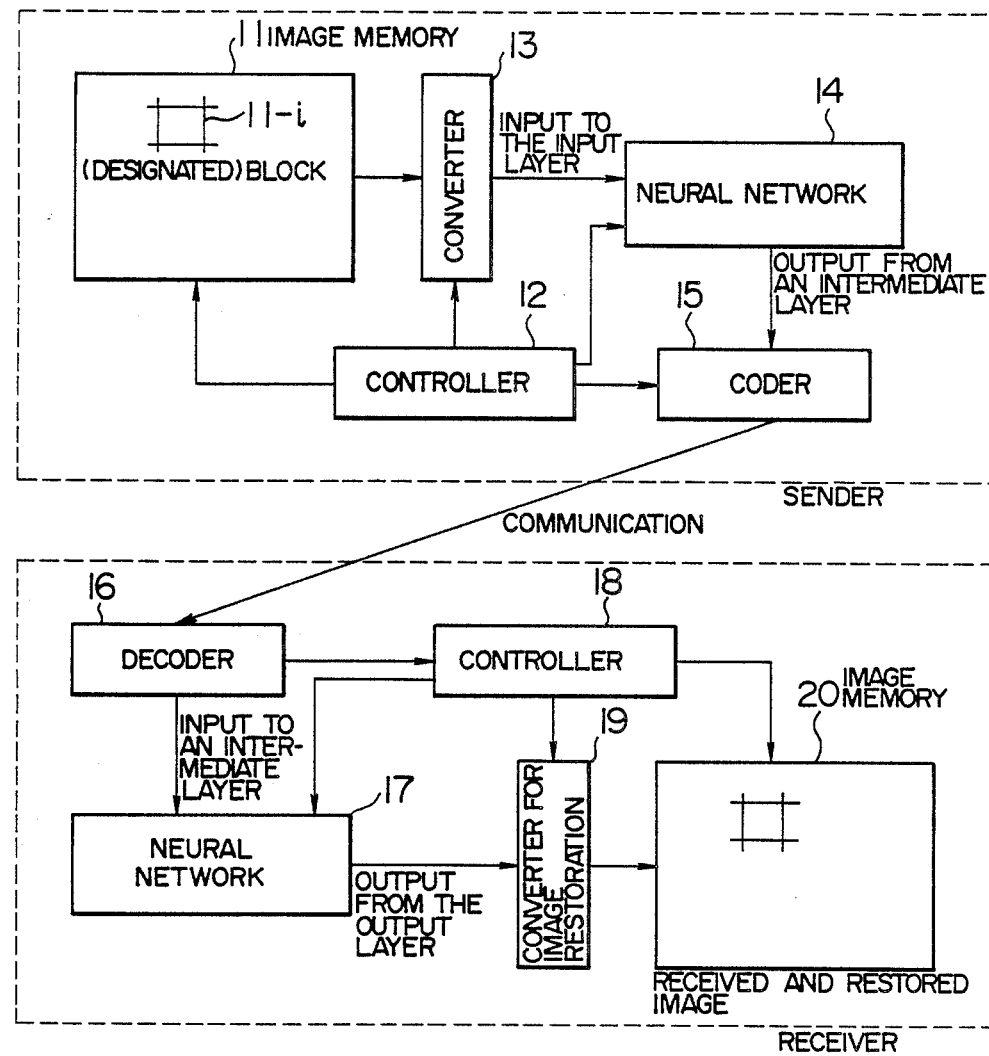
FIG. 1 is a diagram showing a whole configuration of an embodiment of the present invention.

In FIG. 1, image data to be transmitted, which has been stored in an image memory 11 is divided into a plurality of areas (hereinafter, referred to as blocks) 11-i (i=1, 2, . . . ) in accordance with an instruction from a controller 12. The shape of the block 11-i is generally defined by M×N pixels (M and N are integer and, for instance, 8×8, 16×16, or 64×64 pixels). M or N can be one, in which case the block is a pixel array whose width corresponds to one pixel and which extended vertically or laterally in the length direction. Coordinates of the image data which were divided into a plurality of blocks are designated by the controller 12 and are sequentially sent to a converter 13. For each of the blocks 11-i (i=1, 2, . . . ), the converter 13 rearranges the sequence of the pixels forming those blocks to another predetermined data sequence, inverts the pixel information, or adds a predetermined value, thereby modifying the original data. Pixels of each block thus modified are inputted to an input layer of a neural network 14 whose coefficients of connections have been learned in advance. The data of each block which is obtained from its intermediate layer is transmitted. Upon transmission, that data is encoded by a coder 15 and transmitted. The encoding process is executed by an ordinary coding technique having as objects reduction in the loss of data or the multiplexing of noise upon transmission and the performance of efficient data transmission. In addition to the above method, it is also possible to transmit data by further encrypting the data by an encryption method, such as the foregoing DES method and, thereafter, by encoding the encrypted data. On the reception side, the transmitted data is decoded by a decoder 16 and input to an intermediate layer of a neural network 17. In this case, the structure and coefficients of the neural network 17, the format of the modification applied to the pixels, the sequence of the blocks extracted for transmission, and the like are previously transmitted as the control data from the controller 12 through the coder 15 or are simultaneously transmitted as control data in the form of the additional information with the image data. On the reception side 102, such data is decoded by the decoder 16 and the neural network 17 is configured by a controller 18 on the basis of the decoded control data. The image data input to the neural network 17 constructed as mentioned above is restored as output data and sent to a converter for image restoration. The converter 19 converts the image data in accordance with the information regarding the pixel arrangement modification and block sequence received from the controller 18 and writes it into proper locations in an image memory 20. Thus, the original image is restored.

The detailed construction on the transmission side will now be described. First, the block forming process to divide image data to be transmitted into a plurality of blocks, each block having a predetermined size, will be described.

Figure 2:
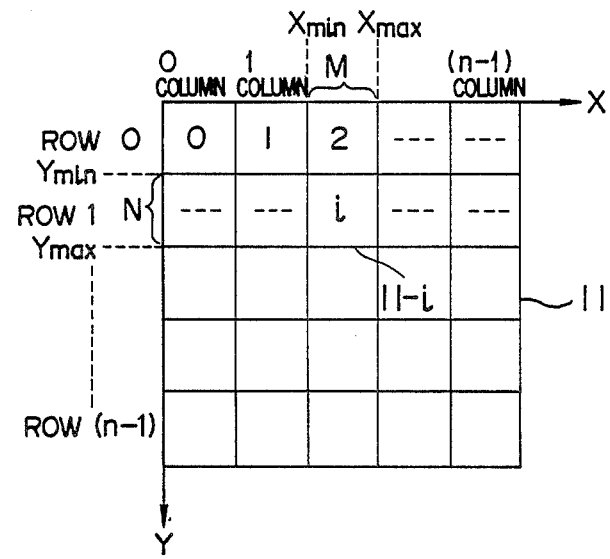
FIG. 2 is a diagram for explaining a block forming process of image data.

A consideration will be given to the case where address signals X and Y are generated from the controller 12 in FIG. 1 and an image in the image memory 11 is divided into blocks in response those signals. The size of a block is set to the predetermined size of M×N pixels and the image is divided into (m×n) blocks. As shown in FIG. 2, the blocks of the image are sequentially numbered 0, 1, 2, .... Although various kinds of numbering methods are possible, an explanation will now be made with respect to the most general example in which the block numbers are set in the raster scanning direction. In this case, the ith block 11-i corresponds to the [i/m]th row in the Y direction and to the (i[i/m]×m)th column in the X direction. [ ] denotes a Gaussian parenthesis. Therefore, the coordinates X and Y of the pixel in the block lie within ranges from $X_{min}$ to $X_{max}$ and from $Y_{min}$ to $Y_{max}$ as shown in the diagram. They are expressed as follows.

$$X_{min} = \{i - [i/m] \times m\} \times M + 1$$

$$X_{max} = \{i - [i/m] \times m\} \times M + M$$

$$Y_{min} = [i/m] \times N + 1$$

$$Y_{max} = [i/m] \times N + N$$

Therefore, the image memory is accessed by properly changing the coordinates between $X_{min}$ and $X_{max}$ and between $Y_{min}$ and $Y_{max}$. Thus, the image of M×N pixels is extracted, and the transmitting process is executed. For the change of the coordinates in the above case, for instance, a scanning process in which X is increased from $X_{min}$ by one until it reaches $X_{max}$, and when it reaches $X_{max}$, "1" is added to Y and X is returned to $X_{min}$, is started from $Y_{min}$ and the process is repeated until Y reaches $Y_{max}$. After completion of the above process of the ith block, "1" is added to i and the processing routine advances to the next block and the transmitting process of the image of the new block can be executed. In this case, the blocks are sequentially selected preferentially in the raster direction, that is, in the lateral direction by sequentially increasing i by "1". However, it is not necessary to increase i by "1" at a time. For instance, by arbitrarily selecting i to be 1, 3, 5, 7, 2, 4, ..., the data can be transmitted in accordance with an arbitrary sequence. In the case of sequentially scanning preferentially in the vertical direction as well, this can be easily executed by merely changing the equations in the above description. Upon block formation, if the size of an image is not equal to the size which is an integer times as large as M or N, the pixels lack at the right edge and lower edge of the image upon division. In such a case, no problem occurs by handling the block formation on the assumption that pixels each having a predetermined value (for instance, 0) exist at those blank positions.

Figure 3:
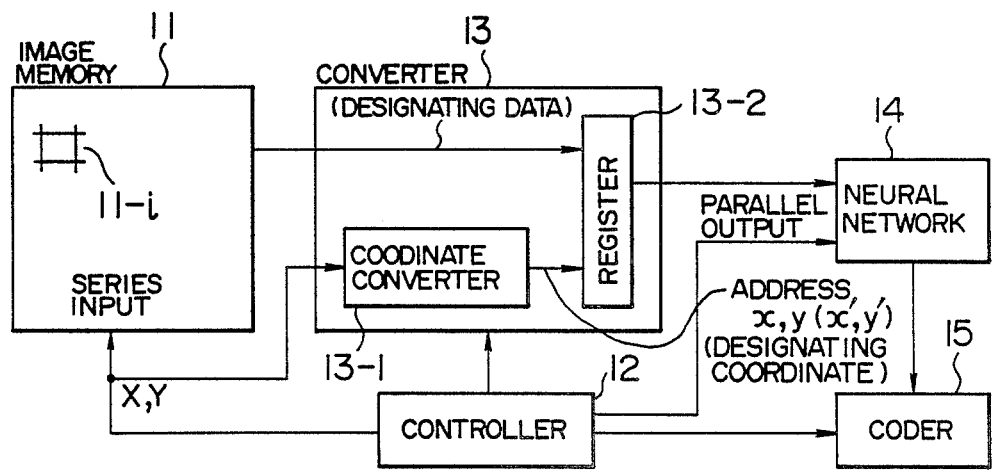
FIG. 3 is a diagram showing an example in which the pixels are rearranged to another sequence.

A practical construction of the converter 13 will now be described. First, FIG. 3 shows the case where the arrangement of the pixels forming a block is rearranged to another sequence. In the diagram, the converter 13 comprises a coordinate converter 13-1 and a register 13-2. The above coordinate address signals X and Y from the controller 12 are inputted to the coordinate converter 13-1 and converted into address signals x and y in the register 13-2. Ordinarily, it is sufficient to simply sequentially store the pixels of the block in the register. In this case, the conversion is executed as follows.

$$x = X - [X/M] \times M$$

$$y = Y - [Y/N] \times N$$

For instance, the one-dimensional register 13-2 can be accessed by using one binary address signal in which x is set to the lower bits and y is set to the upper bits. Thus, the pixel of the coordinates X and Y in the image memory is stored as it is in the location designated by addresses x and y in the register.

In the case of further applying a disturbance to the image, the pixels in the block are rearranged. In this case, the address signals x and y are further converted, for instance, as follows.

$$x' = x + a \bmod M$$

$$y' = y + b \bmod N$$

By accessing the register using x' and y', the pixel is stored at the position which was shifted by the predetermined amounts a and b. If x' and y' are larger than M and N, M and N are subtracted. Therefore, in this case, the address signals x and y are converted into the address signals x' and y' corresponding to the excess amounts over M and N; thus, the address signals x' and y' always remain between 0 and M, and 0 and N, respectively. Therefore, it can be said that the pixel is stored in the register in a circulating mode. In other words, such a process corresponds to that in which the image in the block is separated at the position of x=a and y=b and the separated images are exchanged and stored. On the other hand, if M=N, it is possible to store the pixels by setting as follows.

$$x' = y$$

$$y' = x$$

Such a process corresponds to a rotation of the image in the block.

Figure 4:
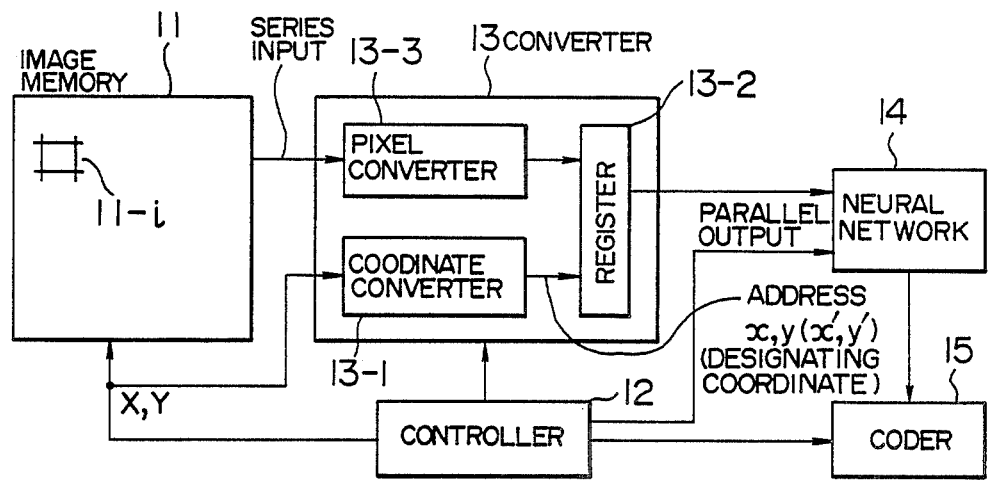
FIG. 4 is a diagram showing an example to convert pixel information.

On the other hand, in the case of inverting the pixel information, the converter 13 is constructed as shown in FIG. 4. In FIG. 4, a pixel converter 13-3 is added. In the pixel converter 13-3, the value f(X, Y) of the pixel accessed from the image memory by the coordinates X and Y is converted as follows.

$$f' = -f$$

Thus, the image is inverted. However, more practically, $$f' = c - f$$

is calculated, where c is a predetermined value and is a constant for bringing the brightness of the inverted image into a predetermined range. For instance, it is sufficient to set the maximum brightness of f to c. In this case, f' has a dark value as the original pixel f is bright.

It is also effective even if a predetermined value is merely added without inverting the image. In such a case, it is sufficient to set.

$$f' = f + d \bmod c$$

where c and d are constant values. By executing the above process, when the brightness exceeds the maximum value c because of the addition of d, the image is stored by only the excess amount. That is, by shifting by only d in a manner such as to circulate the brightness, the value of each pixel can be made to fall into a predetermined range.

Practically speaking, the pixel converter 13-3 to execute the various arithmetic operations as mentioned above can be fundamentally realized by only one adder and its peripheral control circuit. On the other hand, it is also sufficient that the coordinate converter 13-1 merely executes the simple arithmetic operations as mentioned above to the input digital coordinates. Therefore, the converter 13 can be easily realized as a digital circuit.

Further, a practical construction of the converter 19 for image restoration in the receiver will now be described.

Figure 5:
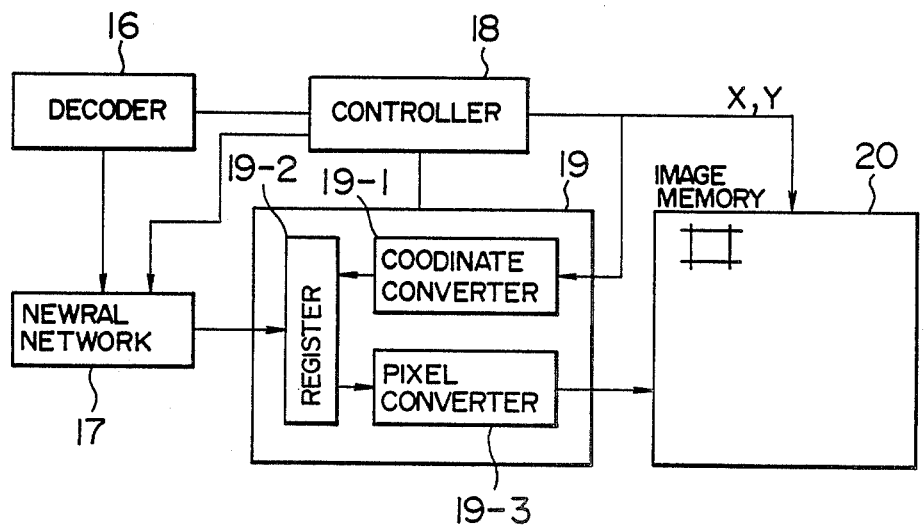
FIG. 5 is a diagram showing an example in which the converted and transmitted image data are reconstructed to restore the original form.

As shown in FIG. 5, the converter 19 comprises a coordinate converter 19-1, a register 19-2, and a pixel converter 19-3. An output signal from the neural network 17 is first stored into the register 19-2. The register is sequentially accessed by a signal from the coordinate converter 19-1. The accessing sequence is determined by the controller 18 on the basis of the control data which has previously been sent or was simultaneously sent as additional information with the image. First, the block coordinates $X_{min}$, $X_{max}$, $Y_{min}$, and $Y_{max}$ in the image memory into which the blocks are written are determined from the block number i as mentioned above. The scan of the pixels within a predetermined range is executed in a predetermined mode (for instance, a sequential scan of the raster type which has already been mentioned before). At this time, the coordinates x and y (or x' and y') to access to the register are generated by the same arithmetic operation as the coordinate conversion at the time of the data transmission mentioned above. Due to this, the pixel signal is obtained from the register 19-2. For the pixel signal, the conversion f'→f which is opposite to the conversion of f→f' as mentioned above is executed in the pixel converter 19-3. For instance, when the inverting mode of $f' = c - f$ is used, $f = c - f'$ is calculated for the transmitted data. In this case, the information indicating that the image is being transmitted in such an inverting mode was sent previously or simultaneously with the image as additional header information. Therefore, it can be used as control data. The constant c used in the above case can be also sent by including it in the control data. The pixel thus restored is written into the location of X and Y in the image memory 20. Therefore, by outputting the content in the image memory to the display apparatus as it is, the sent image can be reproduced and displayed.

Figure 6:
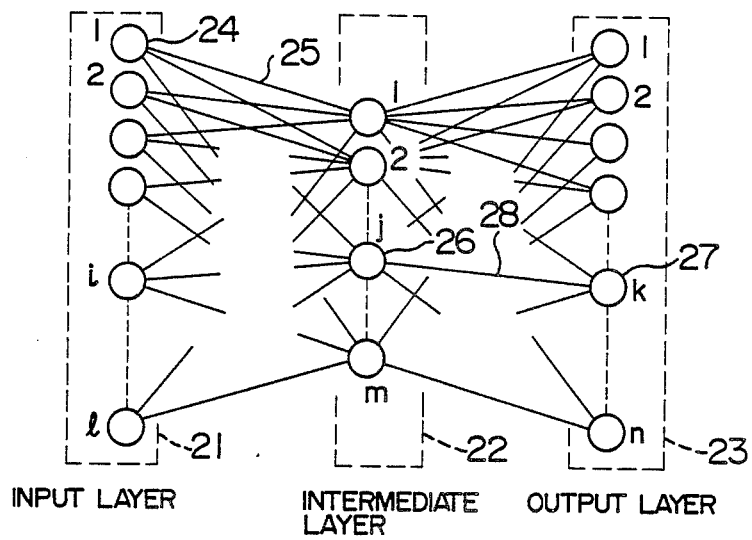
FIG. 6 is a diagram showing an example of a neural network.

The invention will now be further described in detail. FIG. 6 shows an example of a neural network which is used in accordance with the invention. The neural network comprises at least three layers, including an input layer 21, an intermediate layer(s) 22, and an output layer 23. Although a neural network comprising four or more layers having many intermediate layers can be used, the case of using the neural network of three layers will be described here for simplicity of explanation. In the neural network, the structure in which connecting lines 25 exist among all of the neuron elements 24 in the respective layers assumes the standard type. For such a standard neural network, consideration will now be given to the neural network in which a connecting line 28 to connect a jth neuron element 26 of the intermediate layer 22 and a kth neuron element 27 of the output layer 23 is eliminated. That is, coefficients $W_{jk}$ to couple those two neuron elements are forcedly set to 0. The number of combinations of j and k to be set to 0 (which corresponds to the standard network), can be one or a plural number. This is because a variety of constructions of the neural networks can be realized. At this time, each of the coefficients is obtained by performing the input image learning by a well-known method, such as a back propagation method, in a manner such that the image data to be transmitted is inputted to the input layer 21 and a desired image appears in the output layer 23. Upon learning, the image to be transmitted is not necessarily used as an input image, but an arbitrary general image can be also used. The neural network which was learned as mentioned above is a circuit which was autonomously systematized such that the same image as the input image which is given to the input layer 21 is outputted to the output layer 23. In this case, although the explanation has been made by assuming that one or more special neuron elements are forcedly set to 0 (disconnected state), it is actually possible to forcedly set one or more special neuron elements to a predetermined value which is not zero. Such a process is equivalent to that in which some connecting lines which are not changed even by the learning.

Figure 7:
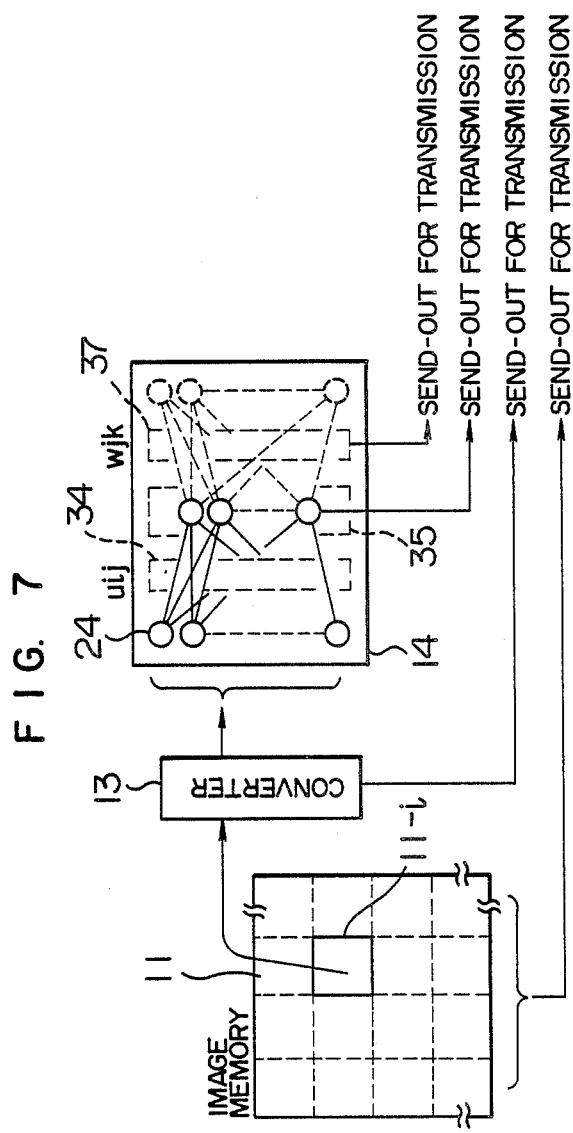
FIG. 7 is a diagram showing a conversion method on the transmission side.

FIG. 7 shows a method whereby the pixels in blocks 11-i (i=1, 2, ... ) extracted from an image memory 11 are supplied to neuron elements 24 of the input layer 21, which was learned as mentioned above, and are converted. After completion of predetermined operations in which the image is two-dimensionally divided into blocks and the sequence of the pixels forming one block is rearranged as mentioned above or the like by the foregoing method, the pixels are supplied to each of the neuron elements in the input layer. Thus, a variety of corresponding relations between the pixels and the neuron elements can be made possible. At this time, the data of an intermediate layer 35, converted by coefficients $U_{ij}$ 34 between the input layer and the intermediate layer which have already been learned, are transmitted. The data of the intermediate layer 35 can be regarded as encrypted image data because the corresponding relations between the input pixels and the neuron elements, which were utilized in a converter 13, and coefficients $W_{jk}$ which were specified by the learning, are not generally known. In this case, the information with respect to the corresponding relations between the pixels and the neuron elements and the learned coefficients $W_{jk}$ can previously be transmitted as control data to a partner or it can also simultaneously be sent as control data in the form of additional information when the data of the intermediate layer 35 is sent. The data which was previously forcedly set to 0 or was forcedly set to a predetermined value is usually included in learned coefficients 37 and can be transmitted as a group. More ideally, however, the coefficients other than 0 or a predetermined value can be transmitted first, then followed by the combinational data of (j, k), and the predetermined values. On the other hand, the sequence of the blocks 11-i (i=1, 2, ...) of the image, when they are added to a neural network 14 and transmitted, can be also freely set as mentioned already. The information indicative of such a sequence can be also previously transmitted as control data or can be also transmitted together with the data. On the other hand, when the image of each of the blocks 11-i (i=1, 2, ...) is applied to the neural network 14, an image in each block can be modified differently from block to block by vertically inverting it or turning it to the left or right by 90° in each block. The brightness of each pixel of the image can be also easily subjected to a process in which the brightness is inverted in some blocks or predetermined values are added in some other blocks. In such a case, the information regarding the sequence by which the blocks 11-i (i=1, 2, ...) are sent and the information with respect to what process was executed for which block can be previously transmitted as control data or can be transmitted with the data. When there are p kinds of modification modes, and if the sender and receiver knows all of these modes in advance, it is only necessary to send the mode information indicative of the q-th mode among p kinds.

Figure 8:
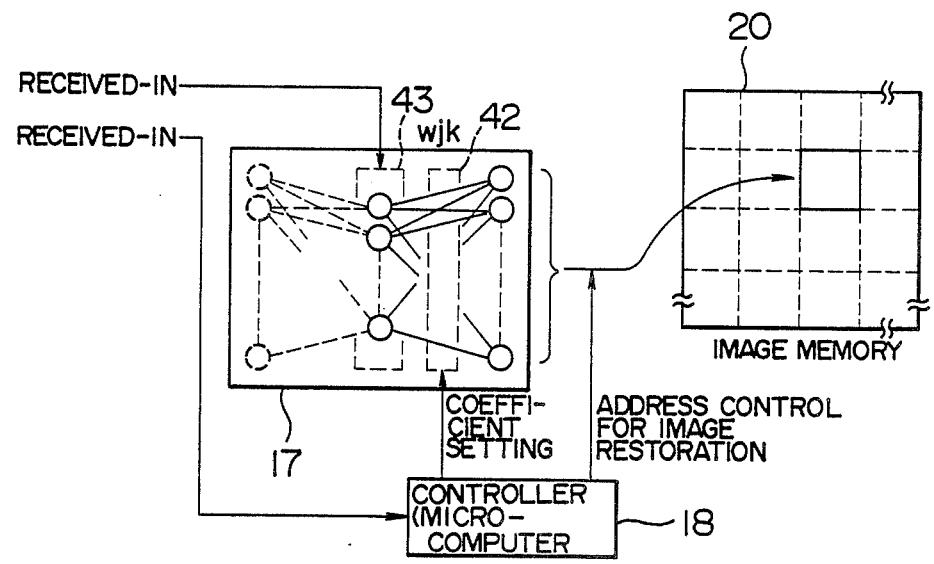
FIG. 8 is a diagram showing a restoration method on the reception side.

On the other hand, on the reception side (receiver), an apparatus having a construction as shown in FIG. 8 is provided and the image is restored by using the control data which was previously sent or which was sent together with the data. In this case, coefficients 42 of a neural network 17 are set on the basis of the control data which was previously sent or which was sent together with the data, and the transmitted data is inputted to an intermediate layer 43. The neural network 17 converts that data and outputs it to an output layer. Even in the case of a neural network comprising four or more layers, the image can be restored if all coefficients at the more rear layers than the intermediate layer from which data is extracted for transmission are preliminarily sent or are sent together with the data.

For the output data, the writing position is controlled by a controller 18, such as a micro-computer, in accordance with the control data which was previously sent or which was sent together with the data, each block of the image is reconstructed at a proper position and orientation in an image memory 20, and a whole image is finally restored.

It should be noted however that the sufficient encryption can be also accomplished even if the converter 13 and converter 19 in the embodiment are omitted, that is, the function to disturb the data arrangement in every block is eliminated or the function to disturb the sequence of the blocks is omitted.

As described above, the present invention provides a new data communication method and apparatus in which neural networks are used as main elements and which has a feature such that a variety is provided to the construction of the neural networks, to the arrangement sequence of the partial images which are added to the neural network, and to the transmission sequence of the partial images. Moreover, the invention also has a feature such that the data of the intermediate layer of the neural network which was learned so as to restore the image is transmitted as fundamental data, and the construction of the neural networks, the arrangement sequence of the pixels in the partial image, and the transmission sequence of the partial images are previously transmitted as control data or are transmitted as attached data of the fundamental data. With such a construction, new communicating means can be realized, in which interception during the transmission and the leakage of the data resulting in breach of secrecy due to erroneous transmission are substantially eliminated, and the practical value is extremely high in the future information society.

Furthermore, the amount of information for transmission can sometimes be minimized by data compression depending on the construction of the neural networks, thus, an improvement in the communicating efficiency can be also expected.

Further, even in the communication of a one-dimensional signal, such as a voice signal or the like, as well as the communication of a two-dimensional signal, such as an image, a similar effect can be expected by dividing the one-dimensional signal into a few intervals (time blocks) and adding to the neural networks.

What is claimed is:

1. A data communication apparatus using a neural network, comprising:

image memory means for storing image data to be transmitted;

image block forming means for dividing said image data into a plurality of blocks, each block having a predetermined size, and for extracting the divided image data from each block;

image converting means for executing a predetermined image converting process on the extracted image data of each block to produce converted image data;

a first multi-layered neural network for encrypting data and having at least an input layer, an intermediate layer and an output layer, and which can output encrypted data from said intermediate layer in response to the application of data to said input layer, said first multi-layered neural network having predetermined weighting coefficients such that the same image data as applied to the input layer is outputted from the output layer;

means for inputting the converted image data which was converted in each block by said image converting means to the input layer of said first multi-layered neural network and for outputting encrypted image data from the intermediate layer of said first multi-layered neural network;

coding means for encoding encrypted image data outputted from the intermediate layer of the first multi-layered neural network and for encoding converting information regarding the converting process which is executed by said image converting means, and for transmitting the encoded encrypted image data and the converting information;

decoding means for receiving and decoding the encoded encrypted image data and converting information transmitted from said coding means;

a second multi-layered neural network for decrypting data and having at least an input layer, an intermediate layer and an output layer, and which can output decrypted data from said output layer in response to the application of encrypted data to said intermediate layer, said second multi-layered neural network having predetermined weighting coefficients such that the same image data as applied to the input layer is outputted from the output layer;

means for inputting the encrypted image data of each block which is provided by said decoding means to the intermediate layer of said second multi-layered neural network and for outputting image data from the output layer of said second multi-layered neural network; and image converting means for converting the image data of each block which is outputted from the output layer of said second multi-layered neural network in accordance with said received converting information.

2. An apparatus according to claim 1, wherein said predetermined image converting process of said image converting means is a process to rearrange an arrangement of pixels forming each block into a predetermined sequence.

3. An apparatus according to claim 1, wherein said predetermined image converting process of said image converting means is a process to invert information of pixels forming each block.

4. An apparatus according to claim 1, wherein said predetermined image converting process of said image converting means is a process to add a predetermined value to information of pixels forming each block.

5. An apparatus according to claim 1, wherein in said first neural network, coefficients to couple special neuron elements forming the intermediate layer of the first neural network and special neuron elements constructing forming the output layer coupled with said neuron elements of the intermediate layer are forcedly set to a predetermined value.

6. An apparatus according to claim 5, wherein said coefficients are set to 0.

7. An apparatus according to claim 1, wherein the weighting coefficients of said second multi-layered neural network are the same as the weighting coefficients of said first muli-layered neural network.

8. A data communication method using a neural-network, comprising the steps of:
(1) dividing data to be transmitted into a plurality of blocks, each block having a predetermined size, and extracting said data from each block;
(2) inputting the extracted data to be transmitted to a first multi-layered neural network for encrypting data and having at least an input layer, an intermediate layer and an output layer, and which can output encrypted data from said intermediate layer in response to the application of data to said input layer, said first multi-layered neural network having predetermined weighting coefficients such that the same data as applied to the input layer is outputted from the output layer and outputting encrypted data from the intermediate layer;
(3) encoding the encrypted data which is outputted from the intermediate layer of said first multi-layered neural network and, thereafter, transmitting said encoded encrypted data;
(4) receiving and decoding the transmitted encoded encrypted data to produce encrypted data; and
(5) inputting the encrypted data of each block to an intermediate layer of a second multi-layered neural network for decrypting data and which has the same construction and the same weighting coefficients as those of the first multi-layered neural network and in which encrypted data is inputted to the intermediate layer and outputted from the output layer.

9. A method according to claim 8, further having the steps of:
(6) executing a predetermined data converting process on the image data of each block which was extracted in said first step; and
(7) converting and restoring the data of each block which was outputted from the output layer of said second multi-layered neural network in said fifth step in accordance with information regarding the predetermined data converting process executed in said sixth step.

10. A method according to claim 9, wherein the information regarding the predetermined data converting process executed in said sixth step is transmitted prior to transmission of the encrypted data in said third step.

11. A method according to claim 8, wherein the weighting coefficients of said second neural network which are used in said fifth step are transmitted prior to transmission of the encrypted data in said third step.

12. A method according to claim 8, wherein weighting coefficients to couple specific neuron elements forming the intermediate layer of said first neural network which are used in said second step and neuron elements forming the output layer coupled with said neuron elements of the intermediate layer of said first multi-layered neural network are forcedly set to a predetermined value.

13. A method according to claim 12, wherein said coefficients are set to 0 in both neural networks.

14. A method according to claim 8, wherein the data to be transmitted is image data.

15. A method according to claim 8, wherein the data to be transmitted is a voice signal.

16. A data transmission apparatus using a neural network, comprising:
data block forming means for dividing data to be transmitted into a plurality of blocks, each block having a predetermined size, and for extracting the data from each block;
a multi-layered neural network for encrypting data and having at least an input layer, an intermediate layer and an output layer, and which can output encrypted data from said intermediate layer in response to the application of data to said input layer, said first multi-layered neural network having predetermined weighting coefficients such that the same image data as applied to the input layer is outputted from the output layer;
means for inputting data of each block extracted by said data block forming means to the input layer of said multi-layered neural network and for outputting encrypted data from said intermediate layer of said multi-layered neural network; and coding means for encoding the encrypted data outputted from the intermediate layer of said multi-layered neural network and for transmitting the encoded encrypted data.

17. An apparatus according to claim 16, further having data converting means for executing a predetermined data converting process on the data of each block extracted by said data block forming means;
and wherein the data of each block converted by said data converting means is input to the input layer of said multi-layered neural network.

18. An apparatus according to claim 16, wherein coefficients coupling specific neuron elements forming the intermediate layer of said neural network and special neuron elements forming the output layer coupled with said specific neuron elements of the intermediate layer are set to a predetermined value.

19. A system for communicating data, such as an image, comprising:
a transmitting unit including means for dividing data to be transmitted into a plurality of blocks, a first neural network for encrypting data and which comprises at least an input layer, an intermediate layer and an output layer and which can output data from said intermediate layer which has predetermined weighting coefficients such that the same data as inputted to said input layer of said first neural network from each of said block is outputted said output layer thereof, and means for outputting data from said intermediate layer in an unit of said block; and
a receiving unit including a second neural network for decrypting data and having at least an input layer, an intermediate layer and an output layer, means for directly inputting said data transmitted to said intermediate layer of said second neural network which has the same weighting coefficients as those of said first neural network, means for decoding said data transmitted in said second neural network to provide reproduced data and means for storing the reproduced data in a unit of said block.

20. A system according to claim 19, wherein said transmitting unit further includes a converter which receives a data block from said dividing means and changes an original arrangement of the data in a block in accordance with predetermined sequence numbers, the output of said converter being inputted to the first neural network; and said receiving unit further includes a converter to recover the original arrangement of the data in the block obtained as an output of the second neural network in accordance with said predetermined sequence numbers.

21. A system according to claim 19, wherein said transmitting unit further includes control means for allowing the blocks to be extracted and transmitted in accordance with predetermined sequence numbers, and said receiving unit further includes control means for rearranging the reproduced data of each block in accordance with said predetermined sequence numbers.

22. A data communication system using neural networks, comprising:
a transmitting apparatus having:
(1) means for storing data;
(2) a first neural network for encrypting data and comprising at least an input layer, an intermediate layer and an output layer, and having weighting coefficients predetermined by learning so that data output from said output layer is the same data as data received by said input layer, wherein said input layer is connected to said storing means, and first data applied to said input layer is encrypted and outputted from said intermediate layer as second data; and
a receiving apparatus for receiving data transmitted from said transmitting apparatus having;
(3) a second neural network for decrypting data comprising at least an input layer, an intermediate layer and an output layer, having weighting coefficients determined on the basis of said weighting coefficients of said first neural network, wherein third data accepted by said intermediate layer of said second neural network is decrypted and outputted from said output layer of said second neural network as fourth data.

23. An apparatus according to claim 22, wherein said weighting coefficients of said first neural network are transmitted as control data from said transmitting apparatus.

24. An apparatus according to claim 22, wherein said weighting coefficients of said first neural network are transmitted together with said second data as control data from said transmitting apparatus.

25. An apparatus according to claim 22, wherein said transmitting apparatus further comprises control means for dividing said data stored in said storing means into a plurality of blocks and for reading out said data from each of said blocks.

26. An apparatus according to claim 25, wherein said transmitting apparatus further comprises converting means connected between said storing means and said input layer of said first neural network for performing a conversion predetermined upon data in blocks which are read out from said storing means and for providing said converted data to said input layer of said first neural network as said first data.

27. An apparatus according to claim 26, wherein said converting means comprises means for inverting an order of data in said blocks read out from said storing means.

28. An apparatus according to claim 26, wherein said converting means comprises means for adding a certain value to said data in said blocks read out from said storing means.

29. An apparatus according to claim 22, wherein said weighting coefficients predetermined by learning are coefficients which connect neuron elements constituting said intermediate layer with neuron elements constituting said output layer in said first neural network.

30. An apparatus according to claim 29, wherein at least one of said weighting coefficients is set to a predetermined value in independence on said learning.

31. An apparatus according to claim 30, wherein said predetermined value is zero.

32. An apparatus according to claim 22, wherein said transmitting apparatus comprises means for encoding said second data and for transmitting encoded second data.

33. An apparatus according to claim 32, wherein said receiving apparatus comprises means for decoding signals received from said transmitting apparatus and for providing decoded signals to said intermediate layer of said second neural network.

34. An apparatus according to claim 22, wherein said data stored in said storing means is image data.

35. An apparatus according to claim 22, wherein said data stored in said storing means is audio signal data.

36. A data communication apparatus comprising:
means for storing data;
a first neural network for encrypting data and comprising at least an input layer, an intermediate layer and an output layer, and having weighting coefficients predetermined so that data output from said output layer is the same as data received by said input layer, wherein first data is inputted to said input layer and second data is outputted from said intermediate layer in the form of encrypted data;
means for encoding said second data and for transmitting encoded second data as third data;
means for receiving said third data and for decoding encoded third data to produce fourth data; and
a second neural network for decrypting data and comprising at least an input layer, an intermediate layer and an output layer, having weighting coefficients determined on the basis of said weighting coefficients of said first neural network, wherein said fourth data is inputted to said intermediate layer of said second neural network and fifth data in the form of decrypted data is outputted from said output layer of said second neural network.

37. An apparatus according to claim 36, wherein said second data is encoded and transmitted with information concerning said weighted coefficients of said first neural network.

38. An apparatus according to claim 36, wherein said data stored in said storing means is divided into a plurality of blocks and read out from each of said blocks to said first neural network.

39. An apparatus according to claim 36, further comprising:
converting means for changing an order of data which is read out from said storing means and for outputting said converted data as said first data.

40. An apparatus according to claim 36, further comprising:
converting means for inverting an order of data read out from said storing means to form converted data and for outputting said inverted data as said first data.

41. An apparatus according to claim 36, further comprising:
converting means for adding a predetermined value to data read out from said storing means to form converted data and for outputting said inverted data as said first data.

42. An apparatus according to claim 36, wherein said weighting coefficients are coefficients which connect neuron elements constituting said intermediate layer with neuron elements constituting said output layer in said first neural network.

43. An apparatus according to claim 42, wherein at least one of said weighting coefficients is set to a predetermined value.

44. An apparatus according to claim 43, wherein said predetermined value is zero.

45. An apparatus according to claim 36, wherein said data stored in said storing means is image data.

46. An apparatus according to claim 36, wherein said data stored in said storing means is audio signal data.

47. A data communication method, comprising:
(A) in a transmitting process performed by a transmitting apparatus comprising a first neural network for encrypting data and which is provided with an input layer, an intermediate layer and an output layer and which has weighting coefficients predetermined so that data output from said output layer is the same as data received by said input layer, the steps of:
(a1) applying first data to be transmitted to said input layer of said first neural network;
(a2) outputting encrypted first data as second data from said intermediate layer; and
(a3) transmitting said second data;
(B) in a receiving process performed by a receiving apparatus comprising a second neural network for decrypting data and which is provided with an input layer, an intermediate layer and an output layer and which has weighting coefficients determined on the basis of said weighting coefficients of said first neural network, the steps of:
(b1) applying second data received from said transmitting process to said intermediate layer of said second neural network; and
(b2) outputting decoded data as third data from said output layer of said second neural network.

48. A method according to claim 47, comprising in said transmitting process the steps of:
dividing data stored in a storing means into a plurality of blocks;
reading out said stored data from each of said blocks; and
performing a predetermined conversion upon said read out data.

49. A method according to claim 47, wherein said first data is image data.

50. A method according to claim 47, wherein said first data in audio signal data.

* * * * *